United States Patent [19]
Fujibayashi

[11] Patent Number: 6,147,811
[45] Date of Patent: Nov. 14, 2000

[54] IMAGE READING APPARATUS

[75] Inventor: Kazuo Fujibayashi, Kawasaki, Japan

[73] Assignee: Canon Kabushiki Kaisha, Tokyo, Japan

[21] Appl. No.: 09/318,603

[22] Filed: May 26, 1999

[30] Foreign Application Priority Data

May 29, 1998 [JP] Japan .................................. 10-166124

[51] Int. Cl.[7] .................................................. G02B 15/14

[52] U.S. Cl. ......................... 359/689; 250/201.8; 359/740

[58] Field of Search ..................................... 359/676, 689, 359/739, 740, 558, 708; 250/201.8; 358/482, 483

[56] References Cited

U.S. PATENT DOCUMENTS 4,626,674 12/1986 Oinoue ................................. 250/201.8

Primary Examiner—Scott J. Sugarman
Attorney, Agent, or Firm—Fitzpatrick, Cella, Harper and Scinto

[57] ABSTRACT

In an image reading apparatus, an original is illuminated and an image of image information on the original surface is formed on a surface of a line sensor by an imaging system. The imaging system includes a zoom lens each element of which is so constructed as to obtain a predetermined effective F-number on a side of the line sensor of the zoom lens independently of zooming. The zoom lens has an aperture stop the diameter of which is adapted to change in synchronism with zooming to obtain a predetermined effective F-number on the side of the line sensor.

9 Claims, 6 Drawing Sheets

FIG. 6
FIG. 9
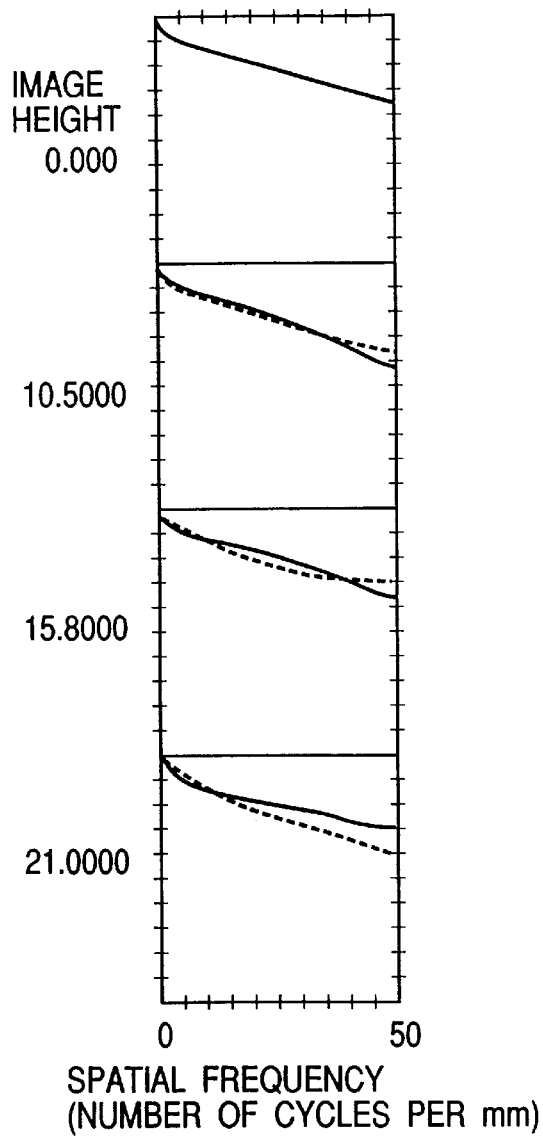
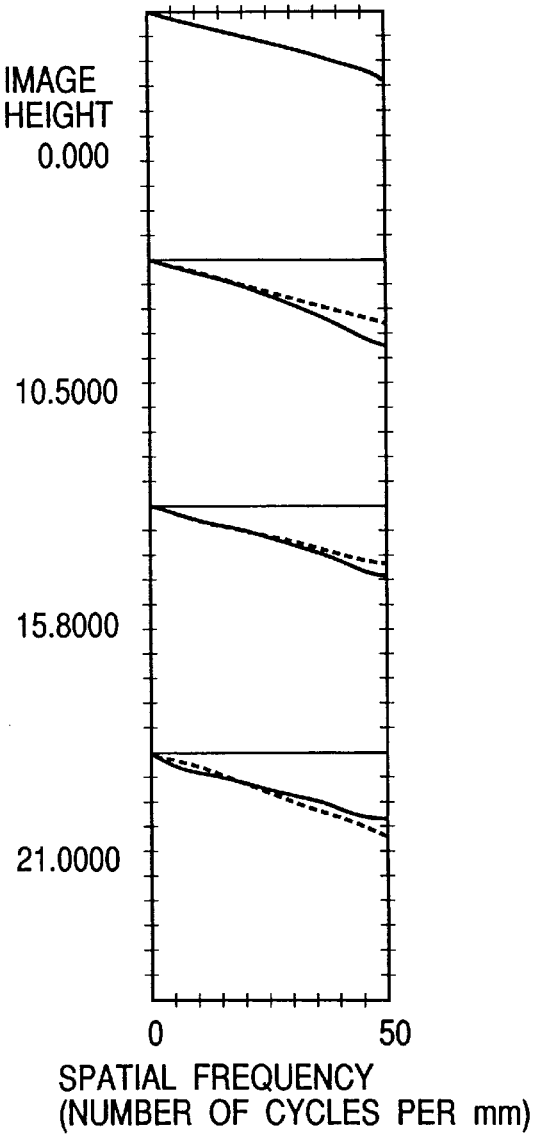
—— FOR THE SAGITTAL DIRECTION
------ FOR THE MERIDIONAL DIRECTION
       (TANGENTIAL)

IMAGE READING APPARATUS

BACKGROUND OF THE INVENTION

1. Field of the Invention

The present invention relates to an image reading apparatus and, more particularly, to an image reading apparatus which is adapted to read image information on an original surface with a line sensor (CCD) as an image reading means through an imaging means having a zoom lens by slit scanning and is suitable for an apparatus such as an image scanner.

2. Related Background Art

Conventionally, various image reading apparatuses for scanning an original surface by slit scanning, forming an image of a light beam based on image information on the original surface on the surface of a line sensor as an image reading means through an imaging lens, and digitally reading the image information with the line sensor have been proposed.

Most imaging lenses used in image reading apparatuses of this type are formed from single lenses. Image information on an original surface is read by a line sensor and then converted into a digital signal. Hence, enlargement and reduction can be easily performed by electronic zooming.

On the other hand, so-called analog copying machines for directly exposing image information on an original surface on, e.g., a photosensitive drum as a recording medium often use a zoom lens as an imaging lens for enlarging or reducing the image. The zoom lens of an analog copying machine has an aperture stop near the lens center, though the stop diameter is fixed in accordance with the zoom magnification.

In an image reading apparatus for digitally reading image information on an original surface using a line sensor by slit scanning, enlargement by electronic zooming limits read data. For this reason, the reproduced image is unclear. In addition, for reduction, image data is thinned to generate an unnatural portion in the reproduced image. Hence, to reproduce a clear enlarged image or a natural reduced image, the imaging lens is preferably formed from a zoom lens.

An image reading apparatus using a zoom lens for an image scanner is proposed in, e.g., Japanese Laid-Open Patent Application No. 9-113804. In this prior art, a first lens group having a negative refracting power and a second lens group having a positive refracting power are sequentially arranged from the object side. Zooming is realized by changing the distance between the first group and second group. However, characteristics such as the light amount in a peripheral portion, distortion, and the like in this prior art do not reach the level of a conventional image scanner using a single-focal-point lens.

For example, when the stop diameter is fixed for enlargement, the effective F-number of the zoom lens of an analog copying machine increases. However, this increase is canceled by an increase in exposure area due to enlargement of the slit image and the exposure amount becomes almost equivalent to that for an equi-magnification (one to one magnification). Hence, for an analog copying machine, the stop diameter is preferably fixed to obtain a constant scanning speed (image reading speed) of the photosensitive drum independently of zooming.

In a digital image reading apparatus, the light-receiving area of the line sensor does not change. For this reason, when the aperture stop diameter is fixed, the effective F-number changes upon zooming, and the light-receiving amount of the line sensor changes. Hence, to ensure an appropriate exposure amount in image reading, the scanning speed must be changed upon zooming.

SUMMARY OF THE INVENTION

It is an object of the present invention to provide an image reading apparatus having a zoom lens and suitable for an apparatus such as an image scanner, in which each element of said zoom lens is so constructed as to obtain a constant effective F-number of a zoom lens on the line sensor side independently of zooming so as to always maintain a predetermined scanning speed (image reading speed) on the line sensor surface.

An image reading apparatus of the present invention, which forms an image of image information on an original surface illuminated with illumination means on a surface of a line sensor through imaging means having a zoom lens and reads the image information with the line sensor, is characterized in that each element of said zoom lens is so constructed as to obtain a predetermined effective F-number of the zoom lens on the side of the line sensor independently of zooming.

Especially, the apparatus is characterized in that the zoom lens has an aperture stop, and a diameter of the aperture stop changes in synchronism with zooming to obtain a predetermined effective F-number on the side of the line sensor, the zoom lens has an aperture stop, and a position of the aperture stop changes with respect to the line sensor and simultaneously a diameter of the aperture stop changes in synchronism with zooming to obtain a predetermined effective F-number on the side of the line sensor, the zoom lens has three lens groups, sequentially from a side of the original surface, which comprises a first group having a negative refracting power, a second group having a positive refracting power, and a third group having a positive refracting power, the aperture stop is arranged in the second group, the second group has a diffractive optical element, the third group has an aspherical surface, the zoom lens performs zooming from a low-magnification end to a high-magnification end by moving the first group to an image plane side to form a convex locus and monotonically moving the second and third groups to the original surface side while maintaining a predetermined distance between an object and the image, and the first group is constructed by two lenses comprising a 1-1 positive lens and a 1-1 negative lens, the second group is constructed by three lenses comprising a 2-1 positive lens, a 2-2 positive lens, and a 2-1 negative lens, and the third group is constructed by two lenses comprising a 3-1 positive lens and a 3-1 negative lens.

BRIEF DESCRIPTION OF THE DRAWINGS

FIGS. 2A and 2B are sectional views of lenses of the first numerical example of the present invention, in which FIG. 2A shows the low-magnification end, and FIG. 2B shows the high-magnification end;

3A shows the low-magnification end, and FIG. 3B shows the high-magnification end;

FIG. 6 is a view showing the MTF characteristics of the diffractive optical element of the present invention;

FIG. 9 is an explanatory view of the diffractive optical element of the present invention.

DETAILED DESCRIPTION OF THE PREFERRED EMBODIMENTS

Figure 1:
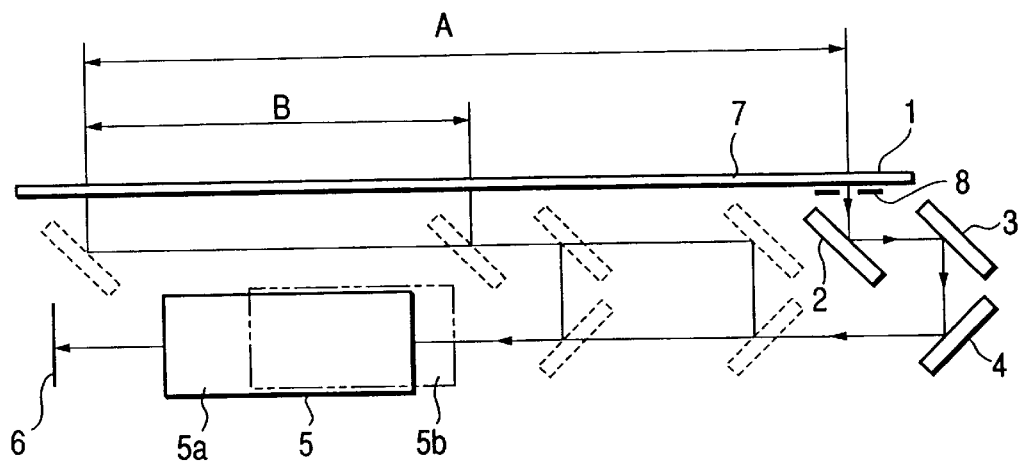
FIG. 1 is a schematic view showing principal part of an image reading apparatus according to the first embodiment of the present invention.

FIG. 1 is a schematic view showing principal part of an image reading apparatus (e.g., an image scanner) according to the first embodiment of the present invention.

Referring to FIG. 1, an original (image) 7 is placed on an original glass table 1. The original 7 has a length A in the sub-scanning direction. A slit 8 is provided near the surface of the original 7 to limit a light beam from the original surface. First, second, and third mirrors 2, 3, and 4 sequentially deflect the light beam based on image information on the surface of the original 7 and guide the light beam to an imaging means (to described later). In this embodiment, to maintain a predetermined optical path length between the original surface and a line sensor 6 (to be described later) during slit scanning, the moving ratio of the first mirror 2 to a mirror unit comprising the second and third mirrors 3 and 4 is set at 2:1. As will be described later, a zoom lens 5 as an imaging means comprises three lens groups. The zoom lens 5 is fixed during slit scanning and moves between a position 5a and position 5b in zooming. The slit scanning range for zooming is limited to, e.g., a range B. The line sensor 6 (CCD) serves as an image reading means long in a direction perpendicular to the surface of the drawing sheet of FIG. 1.

In this embodiment, an image of a light beam from an original on the original glass table 1 illuminated with an illumination means (not shown) is formed on the surface of the line sensor 6 by the imaging means 5 via the first, second, and third mirrors 2, 3, and 4, and image information on the surface of the original 7 is read by the line sensor 6 at a predetermined magnification.

In this embodiment, each element of said zoom lens is so constructed as to obtain a constant effective F-number on the line sensor 6 side of the zoom lens 5 independently of zooming so as to always maintain a predetermined scanning speed (image reading speed) on the surface of the line sensor 6.

The lens arrangement and optical function of the zoom lens as an imaging means will be described next with reference to FIGS. 2A, 2B, 3A, and 3B.

Figure 2A:
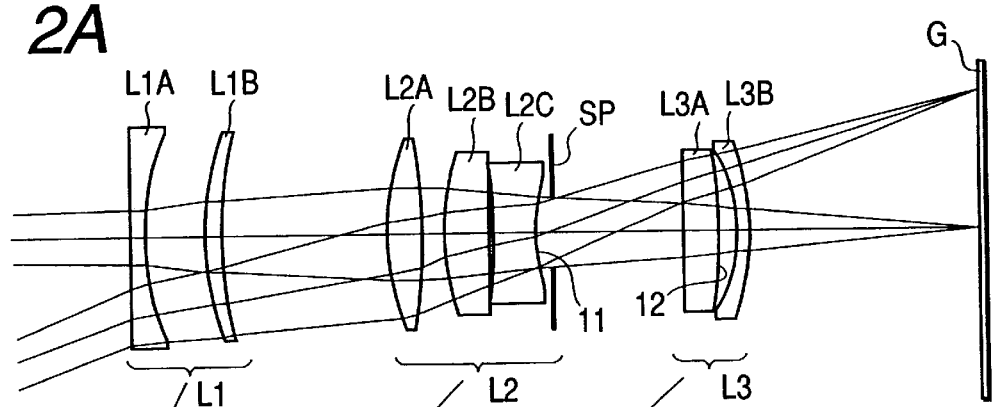
Figure 2B:
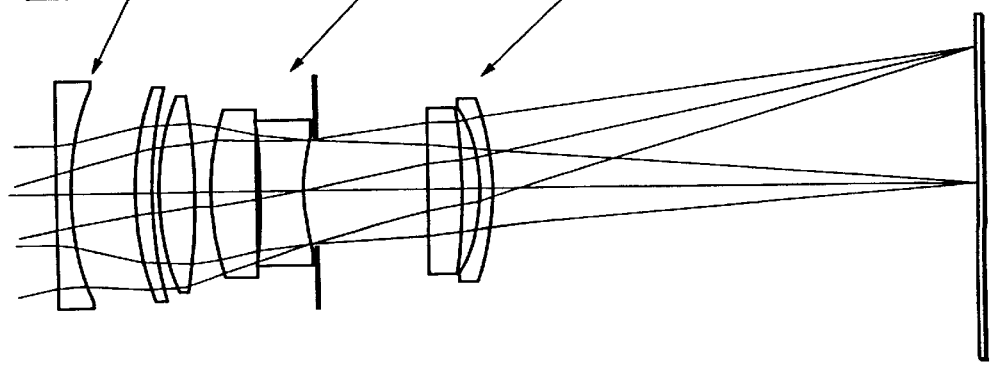
Figure 3A:
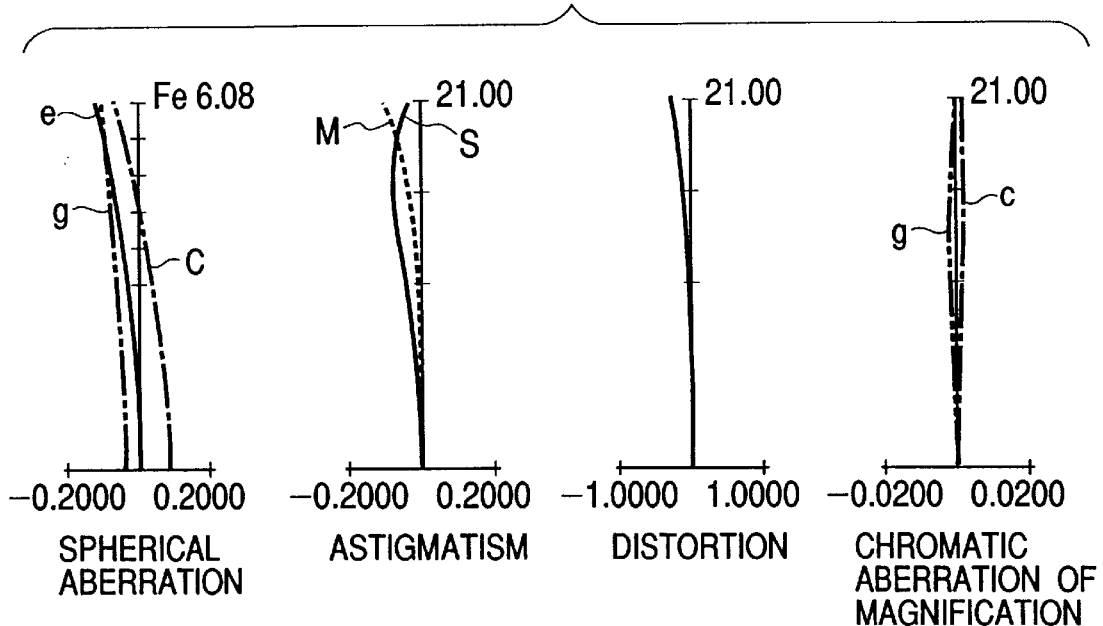
FIGS. 3A and 3B are views showing aberration of the first numerical example of the present invention, in which FIG.
Figure 3B:
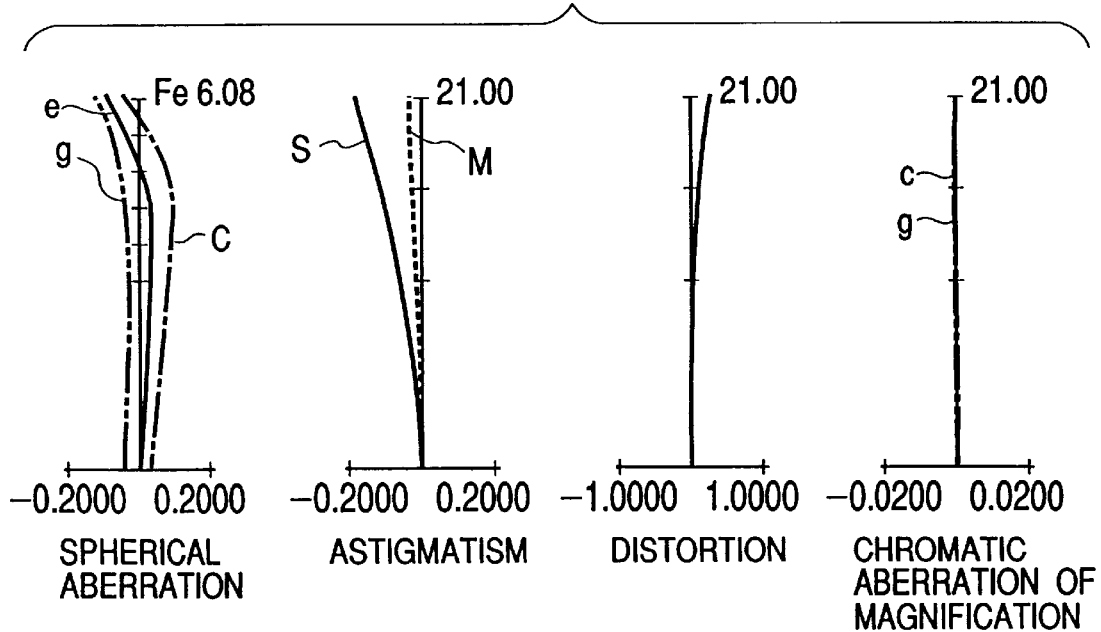

FIGS. 2A and 2B are sectional views of lenses of a zoom lens of the first numerical example (to be described later). FIGS. 3A and 3B are diagrams showing aberration of the zoom lens of the first numerical example (to be described later). Of these views showing the lens sections and aberration, FIGS. 2A and 3A show a state at minimum magnification (low-magnification end), and FIGS. 2B and 3B show a state at maximum magnification (high-magnification end).

Referring to FIGS. 2A and 2B, a first group L1 has a negative refracting power. A second group L2 has a positive refracting power and incorporates a diffractive optical element 11 for correcting a variation in on-axis chromatic aberration due to zooming. In this embodiment, the diffractive optical element 11 is formed on a refracting surface at the image-surface side of a 2-1 negative lens L2C of the second group L2. An aperture stop SP is arranged in the second group L2 to move together with the second group L2 in zooming. In synchronism with zooming, the diameter of the aperture stop SP is changed such that the effective F-number on the line sensor 6 side is made constant. A third group L3 has a positive refracting power and incorporates an aspherical surface 21 to prevent the curvature of field from varying due to zooming. The aspherical surface 21 is formed on a refracting surface at the image-surface side of a 3-1 positive lens L3A of the third group L3. A cover glass G is formed from a parallel flat plate for the line sensor (not shown) and arranged near the image surface.

In the first numerical example in FIGS. 2A and 2B, from the original surface side, the first group L1 is constructed by a 1-1 positive lens L1A and 1-1 negative lens L1B, the second group L2 is constructed by a 2-1 positive lens L2A, 2-2 positive lens L2B, and 2-1 negative lens L2C, and the third group L3 is constructed by the 3-1 positive lens L3A and 3-1 negative lens L3B. The diffractive optical element 11 is formed on the lens surface at the image-surface side of the 2-1 negative lens L2C of the second group L2. The aperture stop SP is arranged in the second group L2. The aspherical surface 21 is formed on the lens surface at the image-surface side of the 3-1 positive lens L3A of the third group L3.

In the first numerical example, as described above, the aperture stop SP is arranged in the second group L2, the diffractive optical element 11 is arranged near the aperture stop SP, and the aspherical surface 21 is arranged in the third group L3. As shown in FIGS. 2A and 2B, in zooming (magnification) from the low-magnification end to the high-magnification end, the first group L1 is independently moved to the image surface side to form a convex locus while maintaining a predetermined finite distance between the object and image, and the second and third groups L2 and L3 are almost monotonically moved to the original surface side. In addition, the air gap between the first group L1 and second group L2 and that between the second group L2 and third group L3 are simultaneously changed. With this arrangement, a zoom lens having a magnification ratio of about 2.0 is constructed.

In the first numerical example, the second-order spectrum of on-axis chromatic aberration is corrected by placing the diffractive optical element 11 near the aperture stop SP in the second group L2. In addition, a variation in curvature of field due to zooming is suppressed by forming the aspherical surface 21 in the third group L3.

In an image reading apparatus for digital reading, generally, the light-receiving area of the line sensor does not change, and therefore, the effective F-number changes in zooming when the aperture stop diameter of the zoom lens is fixed, as described above. To ensure an appropriate exposure amount in image reading, the scanning speed (image reading speed) must be changed in zooming.

In this embodiment, to obtain a predetermined effective F-number on the line sensor side of the zoom lens, the position of the aperture stop SP is changed with respect to the line sensor in synchronism with zooming, and simultaneously, the diameter of the aperture stop SP is largely changed as the magnification becomes high, as shown in FIGS. 2A and 2B. With this arrangement, in this embodiment, a predetermined scanning speed can always be maintained on the line sensor surface.

In this embodiment, since a predetermined resolution can be obtained on the line sensor surface independently of zooming, image information can be read at a higher resolution as the magnification becomes high.

More specifically, in this embodiment, when the original (image) size is doubled by zooming, and the line sensor (CCD) has a predetermined read width, the original read width becomes ½, and the scanning range also becomes ½. The read dot size on the original surface is ½ that in full scanning, so finer image reading is allowed in enlargement. In this embodiment, the effective F-number on the line sensor side of the zoom lens is made constant independently of zooming, as described above. For this reason, the image reading speed on the line sensor surface is the same as that in minimum-magnification (low magnification end). Note that the read speed on the original surface is halved.

The first numerical example of the zoom lens will be described next.

In the first numerical example, ri represents the radius of curvature of the ith lens surface counted from the original surface side, di represents the lens thickness and air gap of the ith lens counted from the original surface side, and ni and vi respectively represent the refractive index and Abbe number of the glass of the ith lens counted from the original surface side. For the diffractive optical element, the coefficient of the phase equation is presented. For the aspherical surface, an aspherical coefficient is presented.

When the X-axis is set along the optical axis, an h-axis is set perpendicular to the optical axis, and the light propagation direction is set as the positive direction, the aspherical shape is given by $$x = \frac{(1/r)h^2}{1+\sqrt{1-(h/r)^2}} + Bh^4 + Ch^6 + Dh^8$$

where r is the paraxial radius of curvature, and B, C, and D are aspherical coefficients.

The diffraction surface of the diffractive optical element is represented as a phase function $\phi(h)$ given by $$\phi(h) = \frac{2\pi}{\lambda}(C_2 h^2 + C_4 h^4 + C_6 h^6)$$

where $\lambda$ is the reference wavelength, h is the height from the lens optical axis, and $C_2$, $C_4$, and $C_6$ are phase coefficients.

First Numerical Example
 f = 50.00 to 77.72
 Effective Fno = 1:6.08
 Imaging magnification = −0.19 to −0.38

| | | | |
|---|---|---|---|
| r1 = −489.264 | d1 = 1.80 | n1 = 1.80811 | v1 = 46.6 |
| r2 = 38.804 | d2 = 9.38 | | |
| r3 = 45.608 | d3 = 3.00 | n2 = 1.85501 | v2 = 23.9 |
| r4 = 74.964 | d4 = variable | | |
| r5 = 38.227 | d5 = 5.41 | n3 = 1.60548 | v3 = 60.7 |

-continued

| | | | |
|---|---|---|---|
| r6 = −90.519 | d6 = 3.62 | | |
| r7 = 36.150 | d7 = 6.50 | n4 = 1.81077 | v4 = 41.0 |
| r8 = 417.475 | d8 = 0.97 | | |
| r9 = −82.841 | d9 = 6.50 | n5 = 1.85501 | v5 = 23.9 |
| r10 = 40.881 | d10 = 1.84 | | |
| r11 = ∞ (stop) | d11 = variable | | |
| r12 = 257.819 | d12 = 5.37 | n6 = 1.73427 | v6 = 40.6 |
| r13 = −59.578 | d13 = 3.12 | | |
| r14 = −19.262 | d14 = 1.80 | n7 = 1.59143 | v7 = 61.2 |
| r15 = −30.800 | d15 = variable | | |
| r16 = ∞ | d16 = 0.70 | n8 = 1.51825 | v8 = 64.2 |
| r17 = ∞ (image surface) | | | |

| Focal length variable interval | 50.00 | 77.72 | 63.58 |
|---|---|---|---|
| d4 | 25.07 | 0.80 | 10.13 |
| d11 | 20.83 | 16.75 | 18.07 |
| d15 | 35.52 | 75.47 | 53.72 |
| Stop diameter | φ10 | φ15.84 | φ12.5 |

[Phase Function]
r10 surface

| c2 | c3 | c4 | c5 |
|---|---|---|---|
| −2.03880D−04 | 0.00000D+00 | 1.98930D−07 | 0.00000D+00 |
| c6 | | | |
| −2.72250D−09 | | | |

[Aspherical Coefficient]
r13 surface

| B | C | D |
|---|---|---|
| −9.76722D−07 | −4.16710D−09 | −7.64856D−12 |

Distance between object and image    406.98
Focal distance of each lens group
 (1)  −73.514
 (2)   46.142
 (3)  221.92

In this embodiment, as shown in FIGS. 3A and 3B showing aberration, although the effective F-number is not changed, satisfactory optical performance can be obtained from the low to high magnifications. In this embodiment, the effective F-numbers at the low- and high-magnification ends on the line sensor side are F=6.08.

Figure 4:
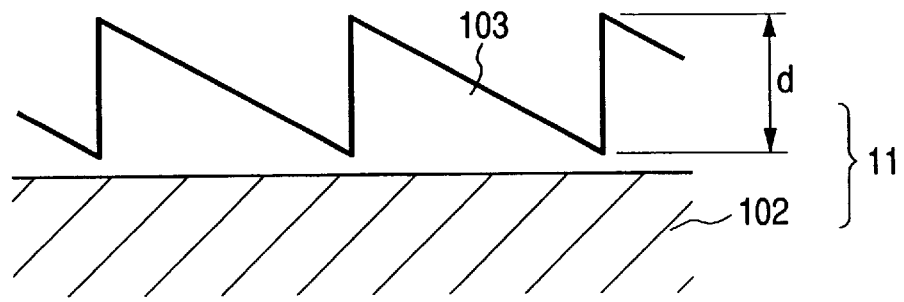
FIG. 4 is an explanatory view of a diffractive optical element of the present invention.

FIG. 4 is an explanatory view showing the shape of a diffraction grating of the diffractive optical element 11 of this embodiment. The diffraction grating has a kinoform shape.

Figure 5:
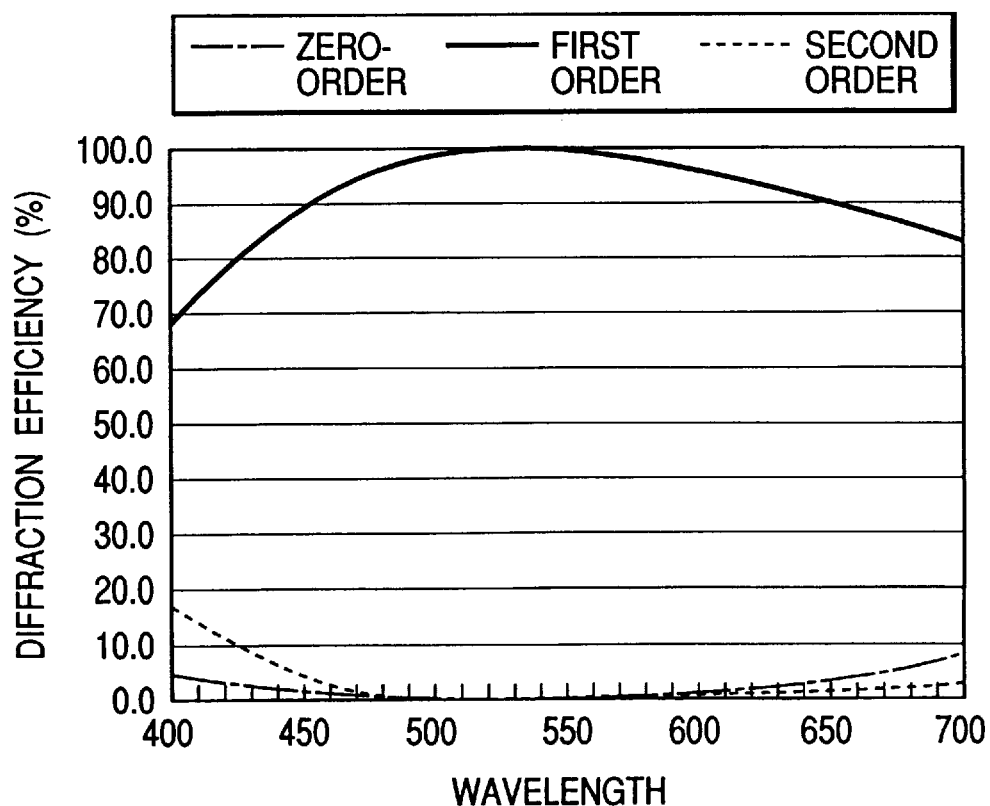
FIG. 5 is an explanatory view of the dependence of the diffractive optical element of the present invention on the wavelength.

FIG. 5 is an explanatory view showing the dependence of the first-order diffraction efficiency of the diffractive optical element shown in FIG. 4 on the wavelength. An actual diffraction grating has an arrangement in which a UV curing resin is applied to a surface of a substrate (substrate glass) 102, and a grating 103 having a grating thickness d with which the first-order diffraction efficiency becomes 100% in correspondence with a wavelength of 530 nm is formed in the resin portion, as shown in FIG. 4. As is apparent from FIG. 5, the diffraction efficiency of the designed order lowers as the wavelength deviates from the optimum value of 530 nm. On the other hand, zero-order and second-order diffracted light close to the designed order increases. An increase in diffracted light of order other than the designed order generates flare and lowers the resolution of the optical system.

FIG. 6 shows the average MTF (Modulation Transfer Function) characteristics in the visible range at the short focal length end for a spatial frequency when the above-described numerical example is realized using the grating shown in FIG. 4. As shown in FIG. 6, the MTF in the low-frequency range is lower than the desired value.

Figure 7:
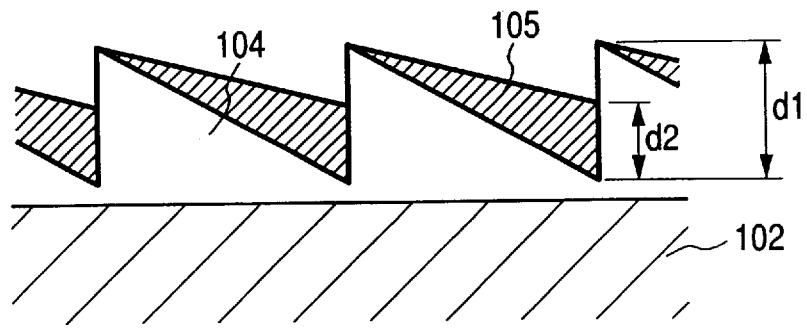
FIG. 7 is an explanatory view of the diffractive optical element of the present invention.

In the numerical example, in place of the grating shown in FIG. 4, a diffraction grating having a multilayered structure formed by stacking a plurality of gratings 103 and 104 on the substrate 102, as shown in FIG. 7, is used as the grating of the diffractive optical element, thereby obtaining desired MTF characteristics.

Figure 8:
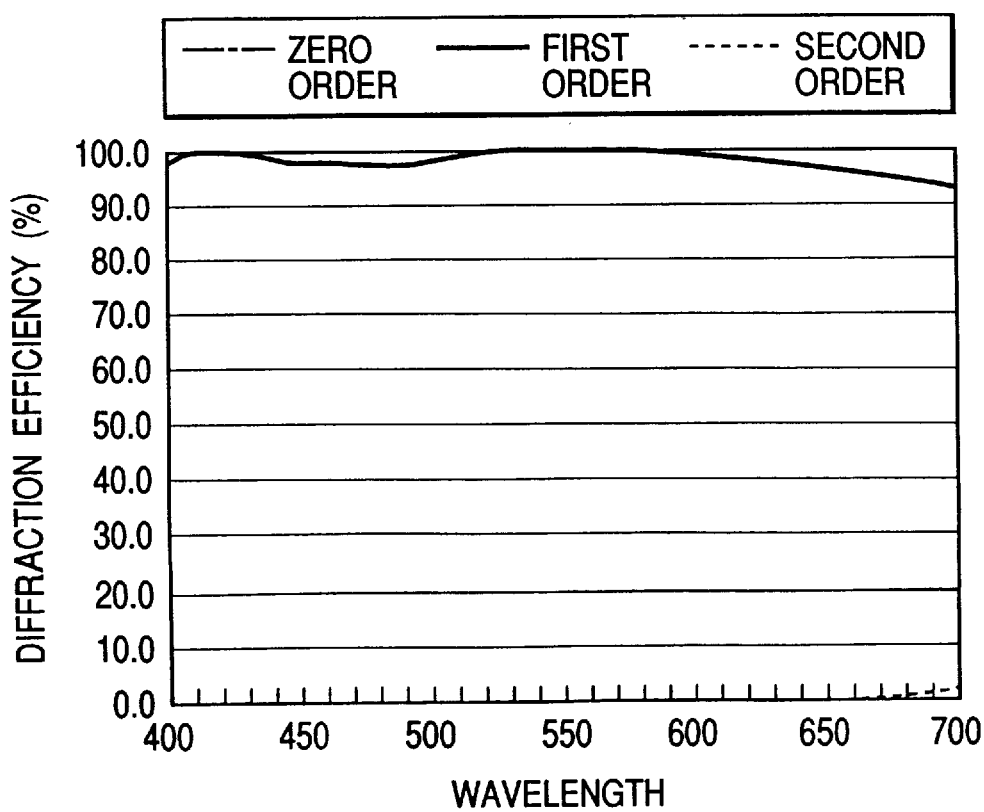
FIG. 8 is an explanatory view of the dependence of a diffractive optical element of the present invention on the wavelength.

FIG. 8 is an explanatory view showing the dependence of the first-order diffraction efficiency of a diffractive optical element with this structure on the wavelength. More specifically, as shown in FIG. 7, the first diffraction grating 104 comprising a UV curing resin (nd=1.499 and vd=54) is formed on the substrate 102, and a second diffraction grating 105 made of another UV curing resin (nd=1.598 and vd=28) is formed on the first diffraction grating 104. For this material combination, a grating thickness d1 of the first diffraction grating 104 is 13.8 $\mu$m, and a grating thickness d2 of the second diffraction grating 105 is 10.5 $\mu$m. As is apparent from FIG. 8, when a diffraction grating having a multilayered structure is used, the diffraction efficiency of the designed order is as high as 95% throughout the wavelength range used.

FIG. 9 shows the MTF characteristics for the spatial frequency in this case. As shown in FIG. 9, use of a diffraction grating having a multilayered structure improves the MTF at a low frequency, so desired MTF characteristics are obtained. As described above, when a diffraction grating having a multilayered structure is used, the optical performance is further improved.

Figure 10:
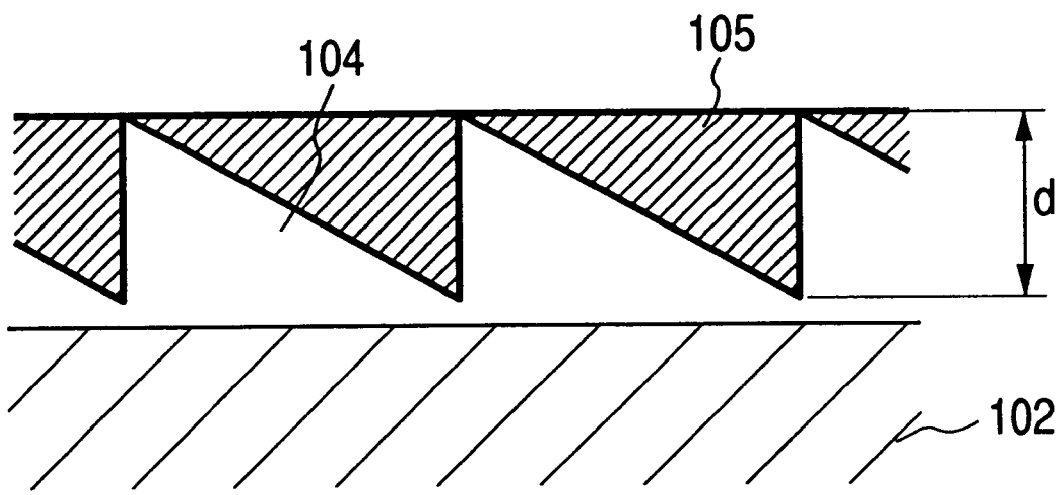
FIG. 10 is an explanatory view of the diffractive optical element of the present invention.

The material of the diffraction grating with a multilayered structure is not limited to a UV curing resin. Another plastic material may be used. Depending on the substrate, the first diffraction grating 104 may be formed directly on the substrate. The grating thicknesses need not always be different. The grating thicknesses of the two diffraction gratings 104 and 105 may be made equal by combining materials, as shown in FIG. 10. In this case, the assembly efficiency of a diffractive optical element can be improved, and a more inexpensive optical system can be provided.

According to the present invention, an image reading apparatus suitable as an apparatus such as an image scanner, in which each element of said zoom lens is so constructed as to obtain a constant effective F-number on the line sensor side of the zoom lens independently of zooming and can always maintain a predetermined scanning speed (image reading speed) on the line sensor surface, can be obtained.

What is claimed is:

1. An image reading apparatus comprising:

illumination means for illuminating an original surface;

a line sensor; and imaging means for forming an image of image information on the original surface on a surface of said line sensor, said imaging means comprising a zoom lens, wherein each element of said zoom lens is so constructed as to obtain a predetermined effective F-number of said zoom lens on a side of said line sensor independently of zooming.

2. An apparatus according to claim 1, wherein said zoom lens has an aperture stop, and a diameter of the aperture stop changes in synchronism with zooming to obtain a predetermined effective F-number on the side of said line sensor.

3. An apparatus according to claim 1, wherein said zoom lens has an aperture stop, and a position of the aperture stop changes with respect to said line sensor and simultaneously a diameter of the aperture stop changes in synchronism with zooming to obtain a predetermined effective F-number on the side of said line sensor.

4. An apparatus according to claim 2, wherein said zoom lens has three lens groups, sequentially from a side of the original surface, which comprises a first group having a negative refracting power, a second group having a positive refracting power, and a third group having a positive refracting power.

5. An apparatus according to claim 4, wherein the aperture stop is arranged in said second group.

6. An apparatus according to claim 4, wherein said second group has a diffractive optical element.

7. An apparatus according to claim 4, wherein said third group has an aspherical surface.

8. An apparatus according to claim 4, wherein said zoom lens performs zooming from a low-magnification end to a high-magnification end by moving said first group to an image surface side to form a convex locus and monotonically moving said second and third groups to the original surface side while maintaining a predetermined distance between an object and the image.

9. An apparatus according to claim 4, wherein said first group is constructed by two lenses comprising a 1-1 positive lens and a 1-1 negative lens, said second group is constructed by three lenses comprising a 2-1 positive lens, a 2-2 positive lens, and a 2-1 negative lens, and said third group is constructed by two lenses comprising a 3-1 positive lens and a 3-1 negative lens.

* * * * *